(12) United States Patent
Shibata (10) Patent No.: US 8,782,301 B2
(45) Date of Patent: Jul. 15, 2014

(54) SEMICONDUCTOR DEVICE AND CONTROL METHOD

(75) Inventor: Taro Shibata, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 207 days.

(21) Appl. No.: 13/276,685

(22) Filed: Oct. 19, 2011

(65) Prior Publication Data

US 2012/0166684 A1 Jun. 28, 2012

(30) Foreign Application Priority Data

Dec. 24, 2010 (JP) ................................. 2010-288274

(51) Int. Cl.
*G06F 13/28* (2006.01)
(52) U.S. Cl.
USPC .................. 710/25; 710/22; 710/34; 710/35
(58) Field of Classification Search
CPC ........................................... G06F 13/28–13/34
See application file for complete search history.

(56) References Cited

U.S. PATENT DOCUMENTS

| 4,455,620 A * | 6/1984 | Watanabe et al. ................ 710/27 |
| 2002/0003574 A1 * | 1/2002 | Kawamura .................... 348/222 |

FOREIGN PATENT DOCUMENTS

| JP | 03-003059 A | 1/1991 |
| JP | 06-110820 A | 4/1994 |
| JP | 6-208540 A | 7/1994 |
| JP | 2002-269027 A | 9/2002 |

OTHER PUBLICATIONS

Office Action dated May 1, 2014, issued in Japanese Patent Application No. 2010-288274 with Partial Translation (3 pages).

* cited by examiner

*Primary Examiner* — Ilwoo Park
(74) *Attorney, Agent, or Firm* — Westerman, Hattori, Daniels & Adrian, LLP (57) ABSTRACT

When a data request signal is inactivated while a DMA controller is executing DMA data transfer in a burst transfer mode, an address at this time is held and a remaining number of transfer times is counted. After the DMA data transfer in the burst transfer mode is finished, the address and the remaining number of transfer times are re-set in the DMA controller and then the DMA data transfer is executed. This makes it possible to re-transfer data remaining at the timing when the data request signal is inactivated, and the DMA data transfer using the burst transfer mode is executed to or from a module requesting the DMA data transfer by using level of the data request signal.

7 Claims, 7 Drawing Sheets

SEMICONDUCTOR DEVICE AND CONTROL METHOD

CROSS-REFERENCE TO RELATED APPLICATION

This application is based upon and claims the benefit of priority of the prior Japanese Patent Application No. 2010-288274, filed on Dec. 24, 2010, the entire contents of which are incorporated herein by reference.

FIELD

The embodiments discussed herein are directed to data transfer technology by direct memory access (DMA).

BACKGROUND

In an information processing system having a CPU (Central Processing Unit), direct memory access (DMA) that is data transfer between a resource and a memory or the like not via the CPU is widely adopted. The data transfer by DMA (DMA data transfer) is controlled by a DMA controller (DMAC).

DMA data transfer modes include, for example, a burst transfer mode. The burst transfer mode is a mode in which data transfer for the number of times that is set in advance is executed in response to one transfer request. In the burst transfer mode, after a DMA data transfer operation is started upon the detection of a rising edge (or a falling edge) of a data request signal, the data transfer for the set number of times is executed irrespective of the level that the data request signal has thereafter.

Further, in some DMA data transfer, data transfer takes place during a period when the data request signal has an active level. In this data transfer, the DMA data transfer operation is started when the data request signal becomes active, the data transfer is continued during a period when the data request signal is active, and when the data request signal becomes inactive, the data transfer operation is finished.

Further, Japanese Laid-open Patent Publication No. 06-208540 discloses a DMA controller which, during the execution of the burst transfer, abandons a bus right to release a bus every time it executes the data transfer once, thereby preventing its long-time occupation of the bus. Further, Japanese Laid-open Patent Publication No. 2002-269027 discloses that a rising edge (or a falling edge) of a data request signal is detected to be converted to a one-cycle pulse, the pulse signals are accumulated as request queues, and a DMA controller executes data transfer according to the accumulated Queues.

Figure 7:
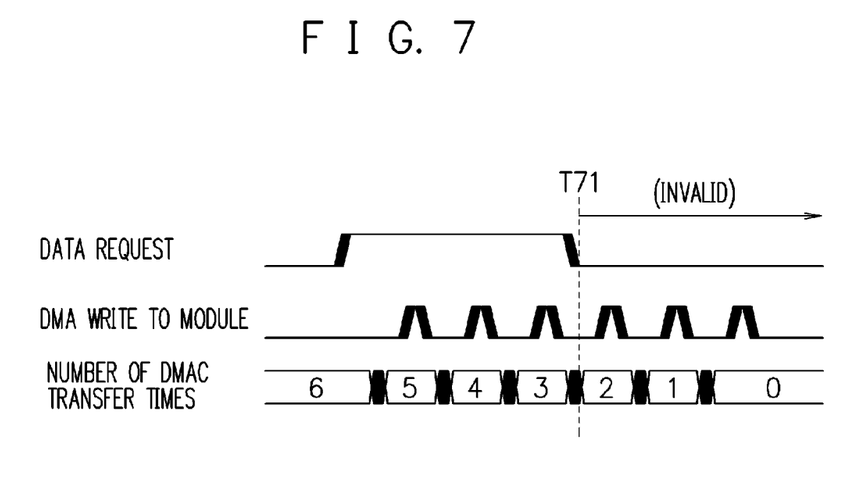
FIG. 7 is a diagram illustrating an example of an operation where transferred data become invalid.

Here, after starting the DMA data transfer operation, the DMA controller executing the data transfer in the burst transfer mode does not check the level of the data request signal until the data transfer for the set number of transfer times is finished. This makes the DMA controller executing the data transfer in the burst transfer mode incapable of normally executing the data transfer to/from a module that requests the DMA data transfer by using the level of the data request signal. This is because, as illustrated in FIG. 7 as an example, a module requesting the DMA data transfer by using the level of the data request signal may possibly inactivate the data request signal before the data transfer for the number of transfer times set in the DMA controller is finished. Then, when the data request signal becomes inactive before the data transfer for the number of transfer times set in the DMA controller is finished, data transferred thereafter becomes invalid.

In FIG. 7, a data request is the data request signal output from the module and is a signal whose active level is high level (high active). Further, DMA write to the module is data write to the module, and the number of DMAC transfer times is the remaining number of data transfer times in the DMA transfer operation in the burst transfer mode. FIG. 7 illustrates an example where the number of data transfer times set in advance in the DMA controller is six. As illustrated in FIG. 7, when the module requesting the DMA data transfer by using the level of the data request signal inactivates the data request signal at time T71, subsequent writes to the module becomes invalid. Thus, for the module requesting the DMA data transfer by using the level of the data request signal, the burst transfer mode in DMA cannot be used.

SUMMARY

According to an aspect of the embodiment, there is provided a semiconductor device including: a DMA controller executing data transfer in a burst transfer mode, when receiving, via a request signal, a request for data transfer by direct memory access; a control circuit supplying the DMA controller with a second request signal based on a first request signal input to the control circuit; an information obtaining circuit obtaining an address and a remaining number of transfer times when the first request signal is inactivated while the data transfer in the burst transfer mode is in progress; and a re-setting circuit setting, in the DMA controller, the address and the remaining number of transfer times which are obtained, after the DMA controller executes the data transfer in the burst transfer mode. When the first request signal is inactivated while the data transfer in the burst transfer mode is in progress, the control circuit keeps the second request signal inactive from an instant when the first request signal is inactivated up to an end of the data transfer in the burst transfer mode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments are described based on accompanying drawings.

(First Embodiment)

A first embodiment will be described.

Figure 1:
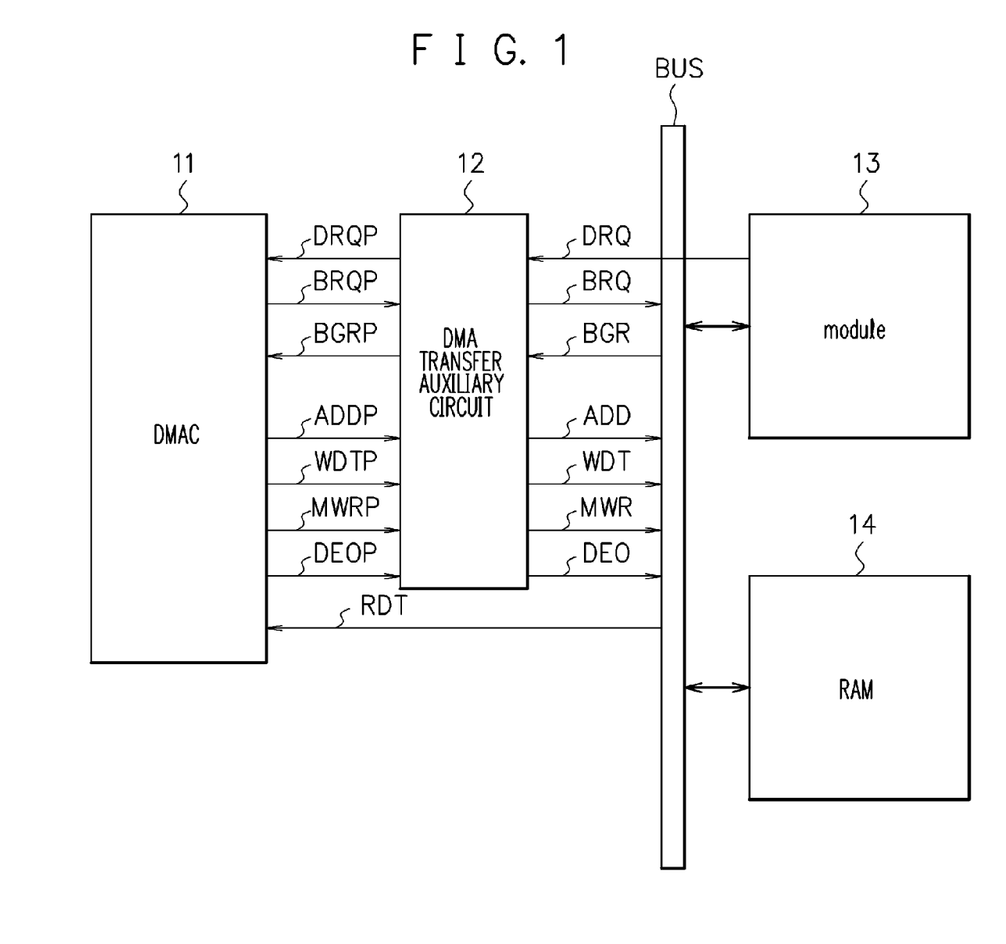
FIG. 1 is a diagram illustrating a configuration example of an information processing system having a semiconductor device (DMA transfer auxiliary circuit) in a first embodiment.

FIG. 1 is a block diagram illustrating a configuration example of an information processing system having a semiconductor device (DMA transfer auxiliary circuit) in a first embodiment. In FIG. 1, a reference numeral 11 denotes a direct memory access (DMA) controller, a reference numeral 12 denotes the DMA transfer auxiliary circuit, a reference numeral 13 denotes a module, a reference numeral 14 denotes a memory (RAM), and BUS denotes a bus.

Note that a characteristic configuration involved in a DMA data transfer operation is illustrated in FIG. 1, and the configuration of the information processing system in this embodiment is not limited to the illustrated configuration. For example, the information processing system in this embodiment has, needless to say, a not-shown CPU, and may have other modules (resources) and so on.

The DMA controller 11 controls data transfer by DMA (DMA data transfer) between the module 13 and the memory 14 or the like not via the CPU. The DMA controller 11 starts a DMA data transfer operation via the bus BUS when receiving a request for the DMA transfer, via a data request signal input thereto. In this embodiment, when detecting a rising edge of the data request signal, the DMA controller 11 executes the data transfer for the number of transfer times set in advance, that is, executes the data transfer in a burst transfer mode, irrespective of the level that the data request signal thereafter has.

The module 13 is connected to the bus BUS and has a circuit realizing a certain function. In this embodiment, the module 13 is a module requesting the DMA data transfer by using the level of the data request signal that it outputs, and makes the data request signal active (high level) when requesting the DMA data transfer. The memory 14 stores various kinds of data. The memory 14 is connected to the bus BUS, and data write and data read to/from the memory are executed from an external part via the bus BUS.

The DMA transfer auxiliary circuit 12 is provided between the DMA controller 11 and the bus BUS. The DMA transfer auxiliary circuit 12 executes various kinds of controls relating to the DMA data transfer so as to enable the DMA controller 11 to execute the data transfer in the burst transfer mode to/from the module 13 requesting the DMA data transfer by using the level of the data request signal. For example, the DMA transfer auxiliary circuit 12 controls various kinds of signals input/output between the DMA controller 11 and the bus BUS or the like when the DMA data transfer is executed in response to the request from the module 13.

As illustrated in FIG. 1, the DMA transfer auxiliary circuit 12 receives a bus right request signal BRQP, an address bus ADDP, a write data bus WDTP, a module write signal MWRP, and a DMA operation end signal DEOP from the DMA controller 11. The DMA controller 11 receives a data request signal DRQP and a bus right grant signal BGRP from the DMA transfer auxiliary circuit 12, and receives a read data bus RDT via the bus BUS.

Further, the DMA transfer auxiliary circuit 12 outputs a bus right request signal BRQ, an address bus ADD, a write data bus WDT, a module write signal MWR, and a DMA operation end signal DEO to the bus BUS. The DMA transfer auxiliary circuit 12 receives a data request signal DRQ from the module 13, and receives a bus right grant signal BGR from a not-shown arbiter (arbitration circuit) or the like via the bus BUS.

Here, in this embodiment, the data request signals DRQ, DRQP, the bus right request signals BRQ, BRQP, the bus right grant signals BGR, BGRP, and the DMA operation end signals DEO, DEOP are set to high level ("H") when activated, and set to low level ("L") when inactivated. Further, the module write signals MWR, MWRP, when their levels are "H", indicate a write transfer direction (data write to the module 13, the memory 14, or the like) and, when their levels are "L", indicate a read transfer direction (data read from the module 13, the memory 14, or the like). Note that the module 13 and the memory 14 are connected to the bus BUS via address buses, write data buses, read data buses, write signals, and so on.

Figure 2:
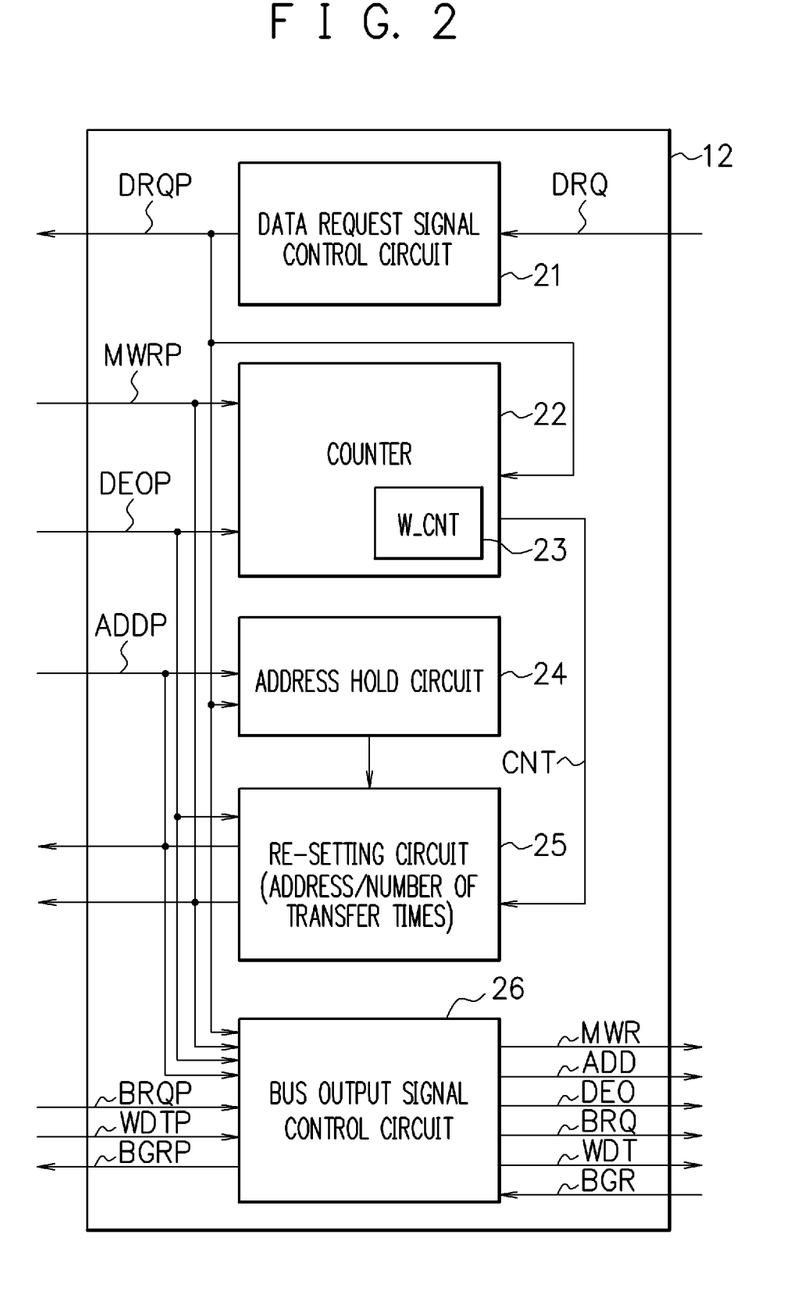
FIG. 2 is a diagram illustrating a configuration example of the DMA transfer auxiliary circuit in the first embodiment.

FIG. 2 is a diagram illustrating a configuration example of the DMA transfer auxiliary circuit 12. The DMA transfer auxiliary circuit 12 has a data request signal control circuit 21, a counter 22, an address hold circuit 24, a re-setting circuit 25, and a bus output signal control circuit 26.

The data request signal control circuit 21 receives the data request signal DRQ from the module 13 and outputs the data request signal DRQP to the DMA controller 11. The data request signal control circuit 21 normally outputs the data request signal DRQP with the same level as that of the data request signal DRQ input thereto. That is, when the data request signal DRQ from the module 13 becomes active ("H"), the data request signal control circuit 21 activates ("H") the data request signal DRQP that it outputs. On the other hand, when the data request signal DRQ from the module 13 becomes inactive ("L"), the data request signal control circuit 21 inactivates ("L") the data request signal DRQP that it outputs.

However, when the level of the data request signal DRQ becomes "L" while the DMA controller 11 is executing the data transfer in the burst transfer mode, the data request signal control circuit 21 keeps the data request signal DRQP at "L" until the data transfer in the burst transfer mode is finished. That is, the data request signal control circuit 21 does not set the data request signal DRQP that it outputs to "H" even when the level of the data request signal DRQ becomes "H" again during a period before an end of the data transfer in the burst transfer mode.

Incidentally, the end of the DMA data transfer in the burst transfer mode may be detected by, for example, using the DMA operation end signal DEOP output from the DMA controller 11. Another alternative method to detect the end of the DMA data transfer in the burst transfer mode may be, for example, that the re-setting circuit 25 outputs a signal indicating the end of a re-setting operation and this signal is used for the detection.

The counter 22 has a counter circuit 23 and outputs its counter value W_CNT to the re-setting circuit 25. The counter 22 receives the data request signal DRQP from the data request signal control circuit 21 and also receives the module write signal MWRP and the DMA operation end signal DEOP from the DMA controller 11. When the level of the data request signal DRQ becomes "L" while the DMA controller 11 is executing the data transfer in the burst transfer mode, the counter 22 counts the number of data whose write (or read) is instructed by the DMA controller 11 from an instant when the level of the data request signal DRQ becomes "L" up to the end of the data transfer in the burst transfer mode.

By using the counter circuit 23, the counter 22 counts the number of times the data write (or read) is instructed, with reference to the module write signal MWRP, when, for example, the data request signal DRQP input thereto changes from "H" to "L". The counter circuit 23 sets an initial value to 0, and after the level of the data request signal DRQP changes from "H" to "L", increments the value by one every time the instruction for data write (or read) is detected. Then, the counter 22 finishes the counting operation when the level of the DMA operation end signal DEOP input thereto becomes "H".

The address hold circuit 24 receives the data request signal DRQP from the data request signal control circuit 21 and also receives the address bus ADDP from the DMA controller 11. The address hold circuit 24 holds an address value (write address or read address) obtained first after the level of the data request signal DRQP input thereto changes from "H" to "L", and outputs the held address value. For example, when the level of the data request signal DRQP input thereto changes from "H" to "L", the address hold circuit 24 holds the address value input via the address bus ADDP and outputs the held address value to the re-setting circuit 25.

The re-setting circuit 25 receives the counter value W_CNT from the counter 22 and also receives the held address value from the address hold circuit 24. Based on the counter value W_CNT and the address value, the re-setting circuit 25 re-sets the address value and the number of transfer times relating to the DMA data transfer in the DMA controller 11. When the level of the DMA operation end signal DEOP input from the DMA controller 11 becomes "H", the re-setting circuit 25 sets, in the DMA controller 11, the address value and the counter value W_CNT which are supplied from the counter 22 and the address hold circuit 24, as the address value and the number of transfer times.

The bus output signal control circuit 26 controls each signal exchanged between the DMA controller 11 and the bus BUS. When the level of the data request signal DRQP input from the data request signal control circuit 21 is "H", the bus output signal control circuit 26 outputs each signal input from the DMA controller 11 as it is to the bus BUS and outputs each signal input from the bus BUS as it is to the DMA controller 11. Specifically, when the level of the data request signal DRQP input thereto is "H", the module write signal MWRP, the address bus ADDP, the DMA operation end signal DEOP, the bus right request signal BRQP, and the write data bus WDTP which are input from the DMA controller 11 are output to the bus BUS as the module write signal MWR, the address bus ADD, the DMA operation end signal DEO, the bus right request signal BRQ, and the write data bus WDT. Similarly, the bus right grant signal BGR input from the bus BUS is input to the DMA controller 11 as the bus right grant signal BGRP.

Further, when the level of the data request signal DRQP input thereto changes from "H" to "L", the bus output signal control circuit 26 executes processing to release (abandon) a bus right that the DMA controller 11 holds to the bus BUS. After the bus right is released (abandoned), the bus output signal control circuit 26 shuts off an access from the DMA controller 11 to the bus BUS. For example, when the level of the data request signal DRQP changes from "H" to "L", the bus output signal control circuit 26 inactivates ("L") the bus right request signal BRQ to release (abandon) the bus right, irrespective of the bus right request signal BRQP input thereto. Then, after the bus right is released (abandoned), the bus output signal control circuit 26 sets the DMA operation end signal DEO that it outputs to "H" to end the DMA data transfer which is executed via the bus BUS.

Next, the DMA data transfer operation in the first embodiment will be described.

Figure 3A:
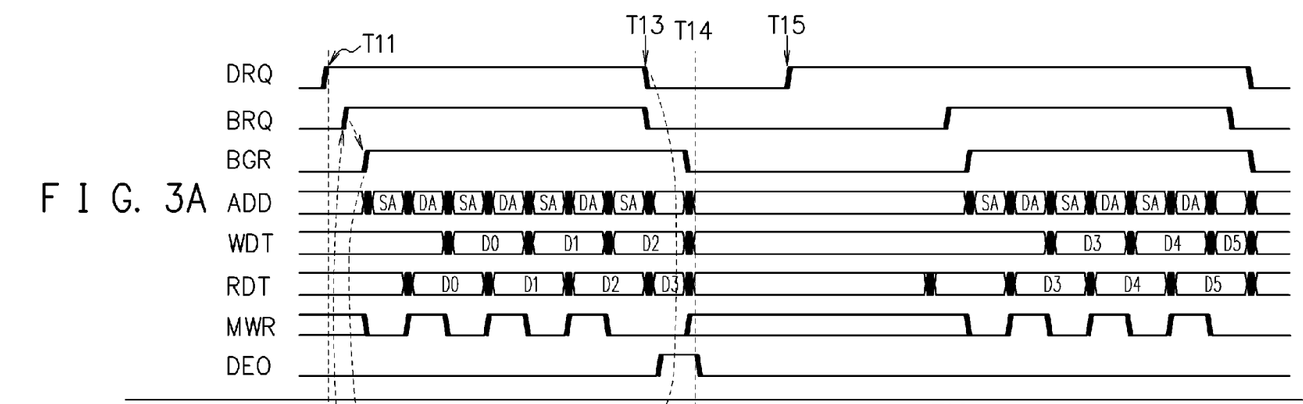
FIG. 3A and FIG. 3B are timing charts illustrating an example of a DMA data transfer operation in the first embodiment.
Figure 3B:
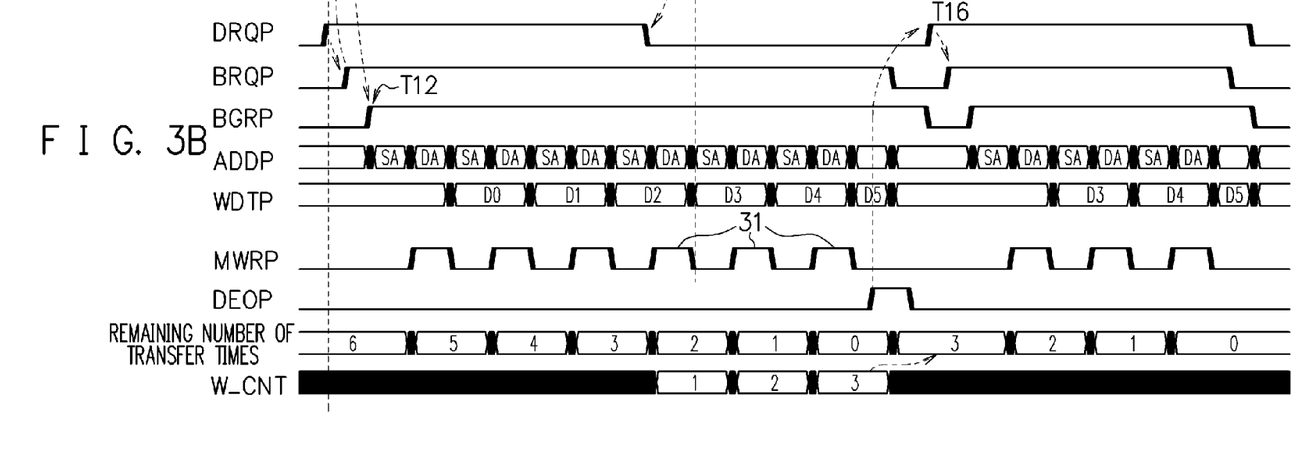

FIG. 3A and FIG. 3B are timing charts illustrating an example of the DMA data transfer operation in the first embodiment. FIG. 3A illustrates an example of waveforms of the signals transferred on the bus BUS, and FIG. 3B illustrates an example of waveforms of the signals exchanged between the DMA controller 11 and the DMA transfer auxiliary circuit 12.

In FIG. 3A, DRQ is the data request signal, BRQ is the bus right request signal, BGR is the bus right grant signal, ADD is the address bus, WDT is the write data bus, RDT is the read data bus, MWR is the module write signal, and DEO is the DMA operation end signal. The data request signal DRQ is output from the module 13 to the DMA transfer auxiliary circuit 12. The bus right request signal BRQ, the address bus ADD, the write data bus WDT, the module write signal MWR, and the DMA operation end signal DEO are output from the DMA transfer auxiliary circuit 12 to the bus BUS. The bus right grant signal BGR is output from the bus BUS to the DMA transfer auxiliary circuit 12. The read data bus RDT is output from the bus BUS to the DMA controller 11.

Further, in FIG. 3B, DRQP is the data request signal, BRQP is the bus right request signal, BGRP is the bus right grant signal, ADDP is the address bus, WDTP is the write data bus, MWRP is the module write signal, and DEOP is the DMA operation end signal. The data request signal DRQP and the bus right grant signal BGRP are output from the DMA transfer auxiliary circuit 12 to the DMA controller 11. The bus right request signal BRQP, the address bus ADDP, the write data bus WDTP, the module write signal MWRP, and the DMA operation end signal DEOP are output from the DMA controller 11 to the DMA transfer auxiliary circuit 12. Further, the remaining number of transfer times is the remaining number of the DMA data transfer times in the burst transfer mode stored in a register or the like in the DMA controller 11, and W_CNT is the counter value in the counter 22 of the DMA transfer auxiliary circuit 12.

The module 13 requests the DMA data transfer by setting the data request signal DRQ to "H" (time T11) in a state where the DMA data transfer that it requested in the past has been completed. When the level of the data request signal DRQ becomes "H", the data request signal control circuit 21 of the DMA transfer auxiliary circuit 12 sets the data request signal DRQP that it outputs to the DMA controller 11 to "H". Subsequently, when the DMA controller 11 sets the bus right request signal BRQP to "H" in order to acquire the bus right to the bus BUS, the bus output signal control circuit 26 of the DMA transfer auxiliary circuit 12 sets the bus right request signal BRQ that it outputs to the bus BUS to "H".

Then, when the bus right is granted, the level of the bus right grant signal BGR becomes "H", and the high-level bus right grant signal BGR is transmitted as the bus right grant signal BGRP via the DMA transfer auxiliary circuit 12 to the DMA controller 11, which then starts the data transfer in the burst transfer mode (time T12). Note that in this example, it is assumed that the number of data transfer times in the burst transfer mode set in advance in the DMA controller 11 is six. Further in FIG. 3A and FIG. 3B, SA represents an address relating to data read (source address) and DA represents an address relating to data write (destination address).

When the module 13 changes the level of the data request signal DRQ from "H" to "L" while the DMA controller 11 is executing the data transfer in the burst transfer mode, the data request signal control circuit 21 sets the data request signal DRQP that it outputs to "L" (time T13).

In response to the change of the data request signal DRQP from "H" to "L", the bus output signal control circuit 26 executes the processing to release the bus right that the DMA controller 11 holds to the bus BUS. In this processing, irrespective of the state of the data transfer in the burst transfer mode that is being executed by the DMA controller 11, the bus output signal control circuit 26 sets the bus right request signal BRQ that it outputs to the bus BUS to "L", and sets the DMA operation end signal DEO to "H" (time T14). Consequently, the output to the bus BUS by the DMA controller 11 is stopped.

Further, when the level of the data request signal DRQP changes from "H" to "L", the address hold circuit 24 of the DMA transfer auxiliary circuit 12 holds an address in the address bus ADDP obtained at this time. In addition, the counter 22 of the DMA transfer auxiliary circuit 12 starts the operation of counting the number of data whose write is instructed by the DMA controller 11. The number of data whose write is instructed is counted with reference to the module write signal MWRP, and the counting is continued until the end of the data transfer in the burst transfer mode by the DMA controller 11, that is, until the level of the DMA operation end signal DEOP becomes "H". In the example illustrated in FIG. 3A and FIG. 3B, after the level of the data request signal DRQP becomes "L", the write takes place three times (waveform 31) and then the data transfer in the burst transfer mode is finished. Therefore, the counter value W_CNT of the counter 22 is "3".

Then, when the level of the DMA operation end signal DEOP becomes "H" in response to the end of the data transfer in the burst transfer mode by the DMA controller 11, the re-setting circuit 25 of the DMA transfer auxiliary circuit 12 re-sets the address value and the number of transfer times in the DMA controller 11. The address value and the number of transfer times are re-set to the address value held in the address hold circuit 24 and the counter value W_CNT of the counter 22 respectively.

Here, when the data request signal DRQP changes from "H" to "L" while the DMA controller 11 is executing the data transfer in the burst transfer mode, the data request signal DRQP is kept at "L" until the data transfer in the burst transfer mode is finished. That is, even when the level of the data request signal DRQ becomes "H" again (time T15) before the end of the data transfer in the burst transfer mode, the data request signal DRQP is kept at "L".

Thereafter, when the DMA controller 11 finishes the data transfer in the burst transfer mode and the level of the DMA operation end signal DEOP becomes "H", the DMA data transfer according to the data request signal DRQ becomes possible. In the example illustrated in FIG. 3A and FIG. 3B, since the level of the data request signal DRQ becomes "H" again at the time T15, the level of the data request signal DRQP becomes "H" immediately after the level of the DMA operation end signal DEOP becomes "H".

Then, similarly to the above, after the bus right is requested via the bus right request signal BRQ (BRQP) and the grant of the bus right is notified via the bus right grant signal BGR (BGRP), the data transfer by the DMA controller 11 is started (time T16). Consequently, the data transfer remaining after the output to the bus BUS by the DMA controller 11 is stopped in response to the change of the data request signal DRQ from "H" to "L" (the number of transfer times: three times) is executed.

According to the first embodiment, when the level of the data request signal DRQ changes from "H" to "L" while the DMA controller 11 is executing the data transfer in the burst transfer mode, the processing to abandon the bus right to the bus BUS is executed. Further, the address relating to the data transfer is held and the number of transfer times up to the end of the data transfer in the burst transfer mode is counted.

Then, when the DMA controller 11 finishes the data transfer in the burst transfer mode, the held address and the counted number of transfer times are set in the DMA controller 11, and then the DMA data transfer is executed according to the data request signal DRQ.

Consequently, even when the level of the data request signal DRQ changes from "H" to "L" while the data transfer in the burst transfer mode is in progress, it is possible to re-transfer data remaining at the timing when the level of the data request signal DRQ becomes "L" and to execute the data transfer using the burst transfer mode. Further, the bus right that the DMA controller 11 holds to the bus BUS is abandoned immediately after the level of the data request signal DRQ becomes "H" to "L", which makes it possible to prevent unnecessary occupation of the bus BUS to improve transfer efficiency in the bus BUS.

(Second Embodiment)

Next a second embodiment will be described.

Figure 4:
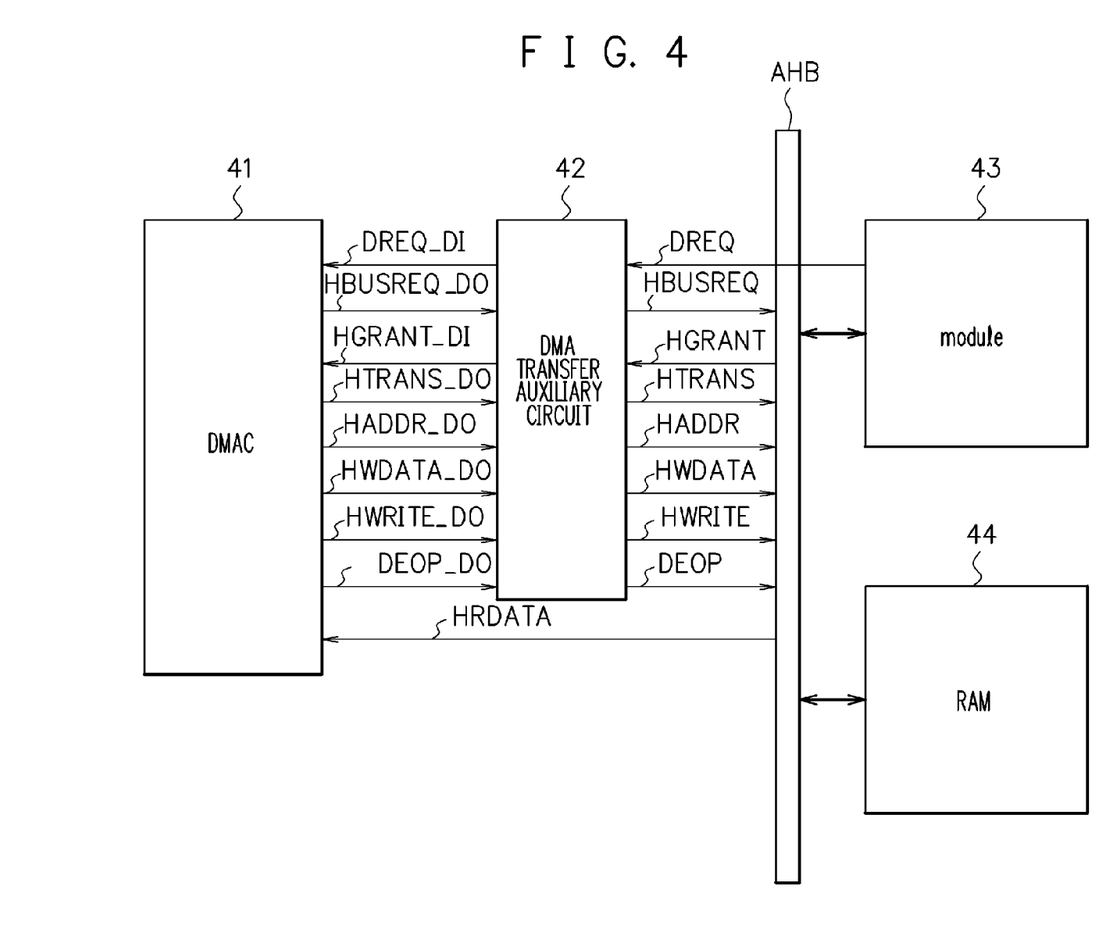
FIG. 4 is a diagram illustrating a configuration example of an information processing system having a semiconductor device (DMA transfer auxiliary circuit) in a second embodiment.

The second embodiment described below is an embodiment where the semiconductor device (DMA transfer auxiliary circuit) is applied to an information processing system utilizing an AHB bus in an AMBA standard of ARM Ltd. as an example. FIG. 4 is a block diagram illustrating a configuration example of the information processing system having the semiconductor device (DMA transfer auxiliary circuit) in the second embodiment. In FIG. 4, a reference numeral 41 denotes a DMA controller, a reference numeral 42 denotes the DMA transfer auxiliary circuit, a reference numeral 43 denotes a module, a reference numeral 44 denotes a memory (RAM), and AHB denotes the AHB bus.

Note that in FIG. 4 as well, a characteristic configuration involved in a DMA data transfer operation is illustrated, and the configuration of the information processing system in this embodiment is not limited to the illustrated configuration. For example, the information processing system, needless to say, has a not-shown CPU, and may have other modules (resources) connectable to the AHB bus.

The DMA controller 41, the DMA transfer auxiliary circuit 42, the module 43, the memory 44, and the AHB bus AHB correspond to the DMA controller 11, the DMA transfer auxiliary circuit 12, the module 13, the memory 14, and the bus BUS in the first embodiment respectively. Further, functions and so on that the DMA controller 41, the DMA transfer auxiliary circuit 42, the module 43, and the memory 44 have are the same as the functions and so on that the DMA controller 11, the DMA transfer auxiliary circuit 12, the module 13, and the memory 14 in the first embodiment have, and therefore, a description thereof will be omitted.

The DMA transfer auxiliary circuit 42 receives a bus right request signal HBUSREQ_DO, a transfer type signal HTRANS_DO, an address bus HADDR_DO, a write data bus HWDATA_DO, a write signal HWRITE_DO, and a data transfer end signal DEOP_DO from the DMA controller 41. The DMA controller 41 receives a data request signal DREQ_DI and a bus right grant signal HGRANT_DI from the DMA transfer auxiliary circuit 42 and receives a read data bus HRDATA via the bus AHB.

Further, the DMA transfer auxiliary circuit 42 outputs a bus right request signal HBUSREQ, a transfer type signal HTRANS, an address bus HADDR, a write data bus HWDATA, a write signal HWRITE, and a data transfer end signal DEOP to the bus AHB. The DMA transfer auxiliary circuit 42 receives a data request signal DREQ from the module 43 and also receives a bus right grant signal HGRANT from a not-shown arbiter (arbitration circuit) or the like via the bus AHB.

In this embodiment, the data request signals DREQ, DREQ_DI, the bus right request signals HBUSREQ, HBUSREQ_DO, the bus right grant signals HGRANT, HGRANT_DI, and the data transfer end signals DEOP, DEOP_DO are set to "H" when activated, and are set to "L" when inactivated. The transfer type signals HTRANS, HTRANS_DO each are a signal indicating whether or not there is data to be transferred next, and are set to a first state ("N") when there is data to be transferred next, and set to a second state ("I") when there is no data to be transferred next. The write signals HWRITE, HWRITE_DO indicate a write transfer direction (data read from the module 43, the memory 44, or the like) when their levels are "H", and indicates a read transfer direction (data read from the module 43, the memory, 44, or the like) when their levels are "L". Note that the module 43 and the memory 44 are connected to the bus AHE via address buses, write data buses, read data buses, write signals, or the like.

Figure 5:
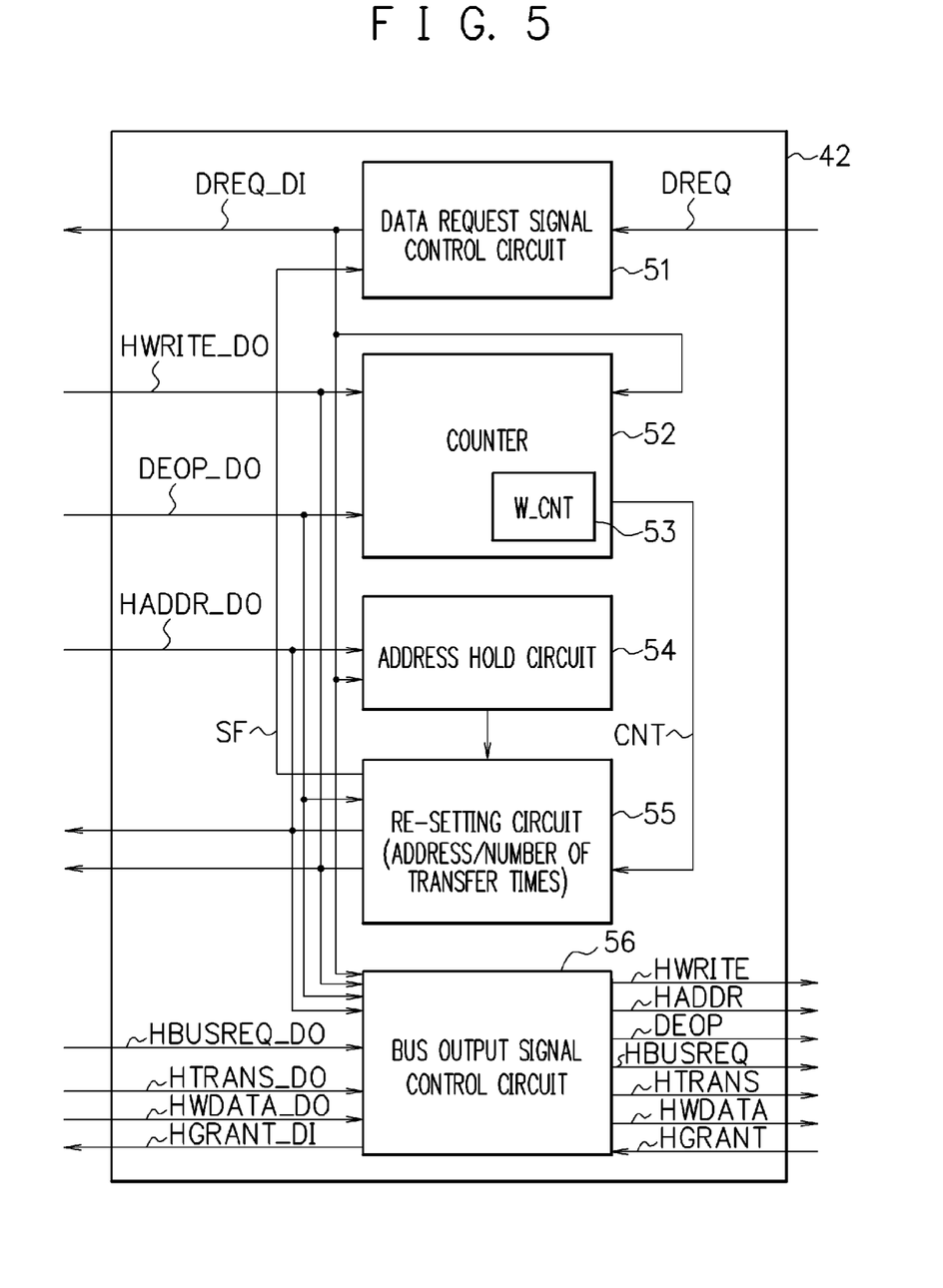
FIG. 5 is a diagram illustrating a configuration example of the DMA transfer auxiliary circuit in the second embodiment.

FIG. 5 is a diagram illustrating a configuration example of the DMA transfer auxiliary circuit 42. The DMA transfer auxiliary circuit 42 has a data request signal control circuit 51, a counter 52, an address hold circuit 54, a re-setting circuit 55, and a bus output signal control circuit 56.

The data request signal control circuit 51 outputs the data request signal DREQ_DI to the DMA controller 41 based on the data request signal DREQ input from the module 43. The data request signal control circuit 51 normally outputs the data request signal DREQ_DI with the same level as that of the data request signal DREQ that is input thereto. However, when the level of the data request signal DREQ becomes "L" while the DMA controller 41 is executing data transfer in a burst transfer mode, the data request signal control circuit 51 keeps the data request signal DREQ_DI at "L" until an end of the data transfer in the burst transfer mode. Incidentally, the end of the DMA data transfer in the burst transfer mode may be detected by, for example, using a signal SF indicating that a re-setting operation is finished, which signal is output from the re-setting circuit 55.

The counter 52 has a counter circuit 53 and outputs its counter value W_CNT to the re-setting circuit 55. When the level of the data request signal DREQ becomes "L" while the DMA controller 41 is executing the data transfer in the burst transfer mode, the counter 52 counts the number of data whose write (or read) is instructed by the DMA controller 41 from an instant when the level of the data request signal DREQ becomes "L" up to the end of the data transfer in the burst transfer mode. By using the counter circuit 53, the counter 52 counts the number of times the data write (or read) is instructed, based on the write signal HWRITE_DO, when, for example, the data request signal DREQ_DI input thereto changes from "H" to "L". The counter circuit 53 sets an initial value to 0, and after the data request signal DREQ_DI changes to "L", increments the value by one every time the instruction for the data write (or read) is detected. Then, the counter 52 finishes the counting operation when the level of the data transfer end signal DEOP_DO input thereto becomes "H".

The address hold circuit 54 holds an address value (write address or read address) obtained first after the level of the data request signal DREQ_DI input from the data request signal control circuit 51 changes from "H" to "L", and outputs the held address value. For example, when the level of the data request signal DREQ_DI input thereto changes from "H" to "L", the address hold circuit 54 holds the address value input via the address bus HADDR_DO and outputs the held address value to the re-setting circuit 55.

The re-setting circuit 55 receives the counter value W_CNT from the counter 52 and also receives the held address value from the address hold circuit 54. When the level of the data transfer end signal DEOP_DO input from the DMA controller 41 becomes "H", the re-setting circuit 55 sets, in the DMA controller 41, the address value and the counter value which are supplied from the counter 52 and the address hold circuit 54, as the address value and the number of transfer times.

The bus output signal control circuit 56 controls each signal exchanged between the DMA controller 41 and the bus AHB. When the level of the data request signal DREQ_DI input thereto is "H", the bus output signal control circuit 56 outputs each signal input from the DMA controller 41 as it is to the bus AHB, and outputs each signal input from the bus AHB as it is to the DMA controller 41. Specifically, when the level of the data request signal DREQ_DI is "H", the write signal HWRITE_DO, the address bus HADDR_DO, and the data transfer end signal DEOP_DO which are input from the DMA controller 41 are output to the bus AHB as the write signal HWRITE, the address bus HADDR, and the data transfer end signal DEOP. Similarly, when the level of the data request signal DREQ_DI is "H", the bus right request signal HBUSREQ_DO, the transfer type signal HTRANS_DO, and the write data bus HWDATA_DO which are input from the DMA controller 41 are output to the bus AHB as the bus right request signal HBUSREQ, the transfer type signal HTRANS, and the write data bus HWDATA. Further, the bus right grant signal HGRANT input from the bus AHB is input to the DMA controller 41 as the bus right grant signal HGRANT_DI.

Further, when the level of the data request signal DREQ_DI input thereto changes from "H" to "L", the bus output signal control circuit 56 executes processing to release (abandon) a bus right that the DMA controller 41 holds to the bus AHB. After the bus right is released (abandoned), the bus output signal control circuit 56 shuts off an access to the bus AHB from the DMA controller 41. For example, when the level of the data request signal DREQ_DI changes from "H" to "L", the bus output signal control circuit 56 sets the bus right request signal HBUSREQ to "L" in order to release (abandon) the bus right, and sets the transfer type signal HTRANS to the second state "I". Then, after the bus right is released (abandoned), the bus output signal control circuit 56 sets the data transfer end signal DEOP that it outputs to "H", and ends the DMA data transfer which is executed via the bus AHB.

Figure 6:
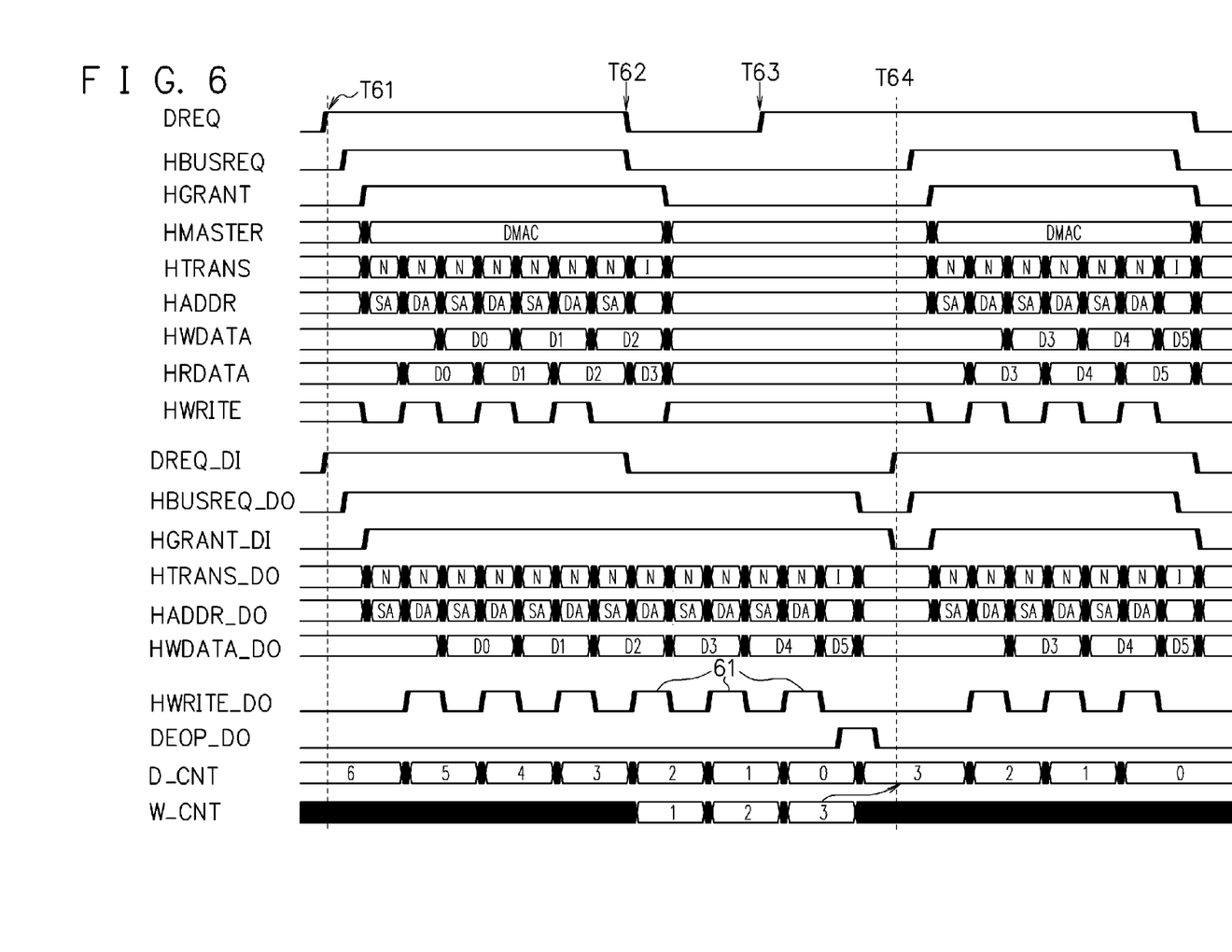
FIG. 6 is a timing chart illustrating an example of a DMA data transfer operation in the second embodiment.

FIG. 6 is a timing chart illustrating an example of the DMA data transfer operation in the second embodiment. In FIG. 6, the same signals as those illustrated in FIG. 4 and FIG. 5 are assigned the same signal names. Further, in FIG. 6, D_CNT represents the remaining number of DMA data transfer times in the burst transfer mode, which is stored in a register or the like in the DMA controller 41, and W_CNT represents the counter value in the counter 52 of the DMA transfer auxiliary circuit 42.

In FIG. 6, the same operation as that in the first embodiment illustrated in FIG. 3A and FIG. 3B is illustrated as an example. That is, FIG. 6 illustrates an example where the number of data transfer times in the burst transfer mode set in advance in the DMA controller 41 is six, and the write takes place three times after the level of the data request signal DREQ becomes "L" while the data transfer in the burst transfer mode is in progress. The DMA data transfer operation in the second embodiment illustrated in FIG. 6 is different from the operation in the first embodiment illustrated in FIG. 3A and FIG. 3B in that the transfer type signal indicating whether or not there is next data is output in the second embodiment, but since the basic operation is the same, a detailed description will be omitted. In the timing chart illustrated in FIG. 6, times T61, T62, T63, T64 correspond to the times T11, T13, T15, T16 given in FIG. 3A and FIG. 3B respectively.

According to the second embodiment, similarly to the first embodiment, when the level of the data request signal DREQ changes from "H" to "L" while the DMA controller 41 is executing the data transfer in the burst transfer mode, the processing to abandon the bus right to the bus AHB is executed. Further, when the data transfer in the burst transfer mode is finished, the address and the remaining number of transfer times are set in the DMA controller 41, and the DMA data transfer is executed according to the data request signal DREQ. Therefore, even if the level of the data request signal DREQ changes from "H" to "L" while the data transfer in the burst transfer mode is in progress, it is possible to re-transfer data remaining at the timing when the level of the data request signal DREQ changes to "L", and the data transfer using the burst transfer mode becomes possible. Further, the bus right to the bus AHB is abandoned immediately after the level of the data request signal DREQ changes from "H" to "L", which makes it possible to prevent unnecessary occupation of the bus AHB to improve transfer efficiency in the bus AHB.

In the above first and second embodiments, the data write in the DMA data transfer is mainly described, but as for the data read, the address is held and the number of read times (transfer times) is counted, and thus the operation is the same.

In the disclosed semiconductor device, when the request signal is inactivated while the data transfer in the burst transfer mode is in progress, the address obtained at this time and the remaining number of transfer times are re-set after the data transfer in the burst transfer mode is finished, which enables the execution of the subsequent portions of the DMA data transfer. Therefore, it is possible to execute the DMA data transfer using the burst transfer mode even if a module requesting the DMA data transfer is a module requesting the data transfer by using the level of the request signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A semiconductor device comprising:
   a direct memory access controller configured to execute data transfer for a certain number of transfer times, when receiving, via a request signal, a request for data transfer by direct memory access;
   a control circuit configured to receive a first request signal and to supply the direct memory access controller with a second request signal as the request signal, the second request signal being based on the first request signal;
   an information obtaining circuit configured to obtain a transfer address and a remaining number of transfer times when the first request signal is inactivated while the data transfer for the certain number of transfer times is in progress; and
   a re-setting circuit configured to set, in the direct memory access controller, the transfer address and the remaining number of transfer times which are obtained by the information obtaining circuit, after the direct memory access controller executes the data transfer for the certain number of transfer times,
   wherein, when the first request signal is inactivated while the data transfer for the certain number of transfer times is in progress, the control circuit keeps the second request signal inactive during a period after the first request signal is inactivated and before the direct memory access controller finishes the data transfer for the certain number of transfer times.

2. The semiconductor device according to claim 1, wherein the information obtaining circuit includes:
   an address hold circuit configured to hold the transfer address which is obtained when the first request signal is inactivated; and
   a counter configured to count the number of data transfer times during the period after the first request signal is inactivated and before the data transfer for the certain number of transfer times is finished.

3. The semiconductor device according to claim 2, wherein the counter is configured to count the number of data transfer times on the basis of a signal indicating data write or data read, the signal being output from the direct memory access controller.

4. The semiconductor device according to claim 1, further comprising
   an output control circuit configured to stop data output from the direct memory access controller to a bus for the data transfer when the first request signal is inactivated while the data transfer for the certain number of transfer times is in progress.

5. The semiconductor device according to claim 4, wherein the output control circuit is configured to execute, to the bus, processing for ending the data transfer when the first request signal is inactivated while the data transfer for the certain number of transfer times is in progress.

6. The semiconductor device according to claim 4, wherein, the output control circuit is configured to execute processing for abandoning a bus right that the direct memory access controller holds to the bus when the first request signal is inactivated while the data transfer for the certain number of transfer times is in progress.

7. A control method comprising:
   executing data transfer for a certain number of transfer times, when a direct memory access controller receives, via a request signal, a request for data transfer by direct memory access, the data transfer being executed to or from a circuit configured to request the data transfer by the direct memory access on the basis of level of the request signal;
   outputting a first request signal from the circuit;
   supplying the direct memory access controller with a second request signal as the request signal, the second request signal being based on the first request signal;
   obtaining a transfer address and a remaining number of transfer times when the first request signal is inactivated while the data transfer for the certain number of transfer times is in progress;
   re-setting, in the direct memory access controller, the transfer address and the remaining number of transfer times which are obtained, after the direct memory access controller executes the data transfer for the certain number of transfer times; and
   when the first request signal is inactivated while the data transfer for the certain number of transfer times is in progress, keeping the second request signal inactive during a period after the first request signal is inactivated and before the direct memory access controller finishes the data transfer for the certain number of times.

\* \* \* \* \*